(12) United States Patent
Juestel et al.

(10) Patent No.: US 6,940,216 B2
(45) Date of Patent: Sep. 6, 2005

(54) GAS DISCHARGE LAMP FOR DIELECTRICALLY IMPEDED DISCHARGES COMPRISING A BLUE PHOSPHOR

(75) Inventors: Thomas Juestel, Aachen (DE); Walter Mayr, Alsdorf (DE); Detlef Uwe Wiechert, Alsdorf (DE); Hartmut Lade, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 72 days.

(21) Appl. No.: 10/179,318

(22) Filed: Jun. 24, 2002

(65) Prior Publication Data
US 2002/0195922 A1 Dec. 26, 2002

(30) Foreign Application Priority Data
Jun. 22, 2001 (DE) .................. 101 30 330

(51) Int. Cl.$^7$ .................. H01J 63/04; C09K 11/08
(52) U.S. Cl. .................. 313/486; 252/301.4 R
(58) Field of Search .................. 313/484–489, 313/466, 468, 635; 252/301.4, 301.4 P, 301.1 R, 301.4 R, 301.4 H, 301.4 S

(56) References Cited

U.S. PATENT DOCUMENTS

| | | | | |
|---|---|---|---|---|
| 4,120,814 A | * | 10/1978 | Izumitani et al. | 252/301.4 P |
| 4,124,524 A | * | 11/1978 | Danielmeyer et al. | 252/647 |
| 4,952,422 A | * | 8/1990 | Pappalardo et al. | 427/67 |
| 4,979,893 A | * | 12/1990 | Pappalardo et al. | 427/67 |
| 5,122,710 A | * | 6/1992 | Northrop et al. | 313/487 |
| 5,424,006 A | * | 6/1995 | Murayama et al. | 252/301.4 R |
| 5,604,396 A | * | 2/1997 | Watanabe et al. | 313/485 |
| 5,611,958 A | * | 3/1997 | Takeuchi et al. | 252/301.4 P |
| 5,684,359 A | * | 11/1997 | Yano et al. | 313/487 |
| 5,844,361 A | * | 12/1998 | Petersen et al. | 313/495 |
| 5,932,139 A | * | 8/1999 | Oshima et al. | 252/301.16 |
| 6,010,644 A | * | 1/2000 | Fu et al. | 252/301.4 R |
| 6,093,346 A | * | 7/2000 | Xiao et al. | 252/301.4 F |
| 6,100,633 A | * | 8/2000 | Okumura et al. | 313/486 |
| 6,117,362 A | * | 9/2000 | Yen et al. | 252/301.4 R |
| 6,168,892 B1 | * | 1/2001 | Ohara et al. | 430/45 |
| 6,290,875 B1 | * | 9/2001 | Oshio et al. | 252/301.4 R |
| 6,436,313 B1 | * | 8/2002 | Srivastava et al. | 252/301.4 P |
| 6,666,991 B1 | * | 12/2003 | Atarashi et al. | 252/301.4 R |
| 6,740,262 B2 | * | 5/2004 | Oshio | 252/584 |

FOREIGN PATENT DOCUMENTS

EP   0433916   6/1991   ............ H01J/61/44

* cited by examiner

Primary Examiner—Joseph Williams
Assistant Examiner—Dalei Dong

(57) ABSTRACT

The invention relates to a gas discharge lamp for dielectrically impeded discharges, which gas discharge lamp includes a phosphor layer containing a blue phosphor with a host lattice and $Nd^{3+}$ as the activator, electrodes for a dielectrically impeded discharge and means for igniting and maintaining the discharge.

The invention also relates to a blue phosphor with a host lattice and $Nd^{3+}$ as the activator.

8 Claims, 1 Drawing Sheet

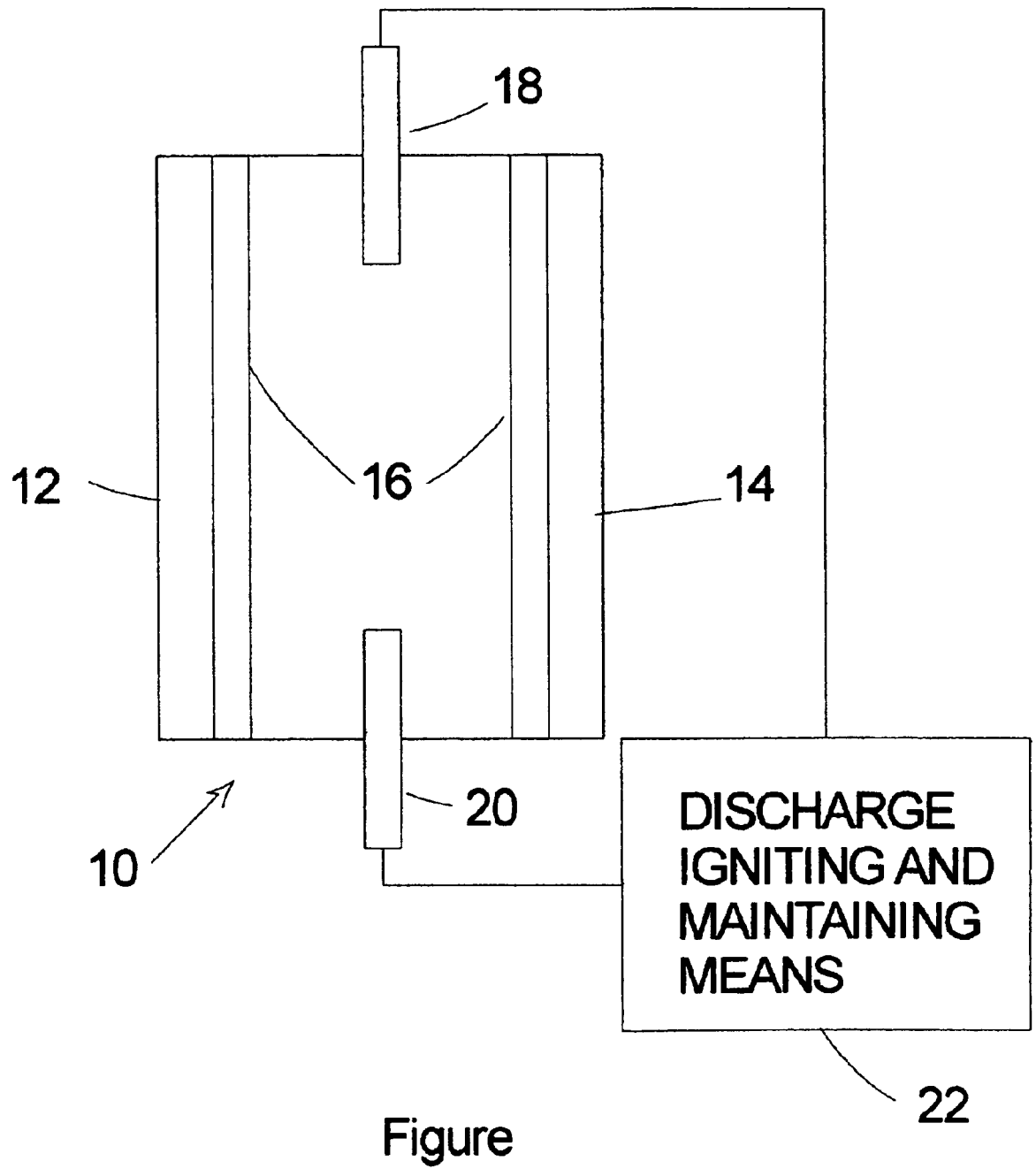
Figure

GAS DISCHARGE LAMP FOR DIELECTRICALLY IMPEDED DISCHARGES COMPRISING A BLUE PHOSPHOR

The invention relates to a gas discharge lamp for dielectrically impeded discharges, which gas discharge lamp is provided with a discharge vessel filled with a gas filling, which discharge vessel comprises at least one wall of a dielectric material and at least one wall having a surface which is at least partly transparent to visible radiation and coated with a phosphor layer containing a blue phosphor, and provided with an electrode structure for a dielectrically impeded discharge and with means for igniting and maintaining said dielectrically impeded discharge.

Gas discharge lamps for dielectrically impeded discharges are used, particularly, in office automation devices, for example color copiers and color scanners, in signal devices, for example as brake lights and direction indicator lights in automobiles, in auxiliary illumination devices, for example the courtesy lighting of automobiles, as well as, in particular, for the background lighting of displays and display screens, for example of liquid crystal displays.

Said applications require the luminance to be both uniform throughout the length of the lamp and high. To increase the luminance, it is necessary to increase the power that is coupled into the system. However, this also causes a higher load to be imposed on, inter alia, the phosphors in the phosphor layer. The phosphors degrade more rapidly and the luminous output decreases more rapidly during operation as the power coupled in increases.

Particularly gas discharge lamps with a dielectrically impeded discharge containing blue phosphors with $Eu^{2+}$ as the activator, for example $BaMgAl_{10}O_{17}:Eu^{2+}$, are affected by said degradation.

Blue phosphors for gas discharge lamps with dielectrically impeded discharge that are less subject to degradation are the phosphors $CaWO_4$ and $Sr_2P_2O_7:Sn$ disclosed in EP 0 433 916.

It is an object of the invention to provide a gas discharge lamp for dielectrically impeded discharges, which comprises a phosphor layer containing a blue phosphor, which phosphor demonstrates an improved capacity to adapt to the dielectrically impeded discharge.

In accordance with the invention, this object is achieved by a gas discharge lamp for dielectrically impeded discharges, which gas discharge lamp comprises a discharge vessel filled with a gas filling, which discharge vessel comprises at least one wall of a dielectric material and at least one wall having a surface which is at least partly transparent to visible radiation and a phosphor layer containing a blue phosphor with a host lattice and $Nd^{3+}$ as the activator, electrodes for a dielectrically impeded discharge and means for igniting and maintaining the discharge.

In a gas discharge lamp with a phosphor layer containing a blue phosphor with a host lattice and $Nd^{3+}$ as the activator, degradation of the phosphor is reduced and the color point of the lamp remains unchanged. In addition, a suitable choice of the host lattice enables the absorbing capacity of the phosphor for UV radiation to be adapted to the emission from the gas discharge.

The invention is also based on the recognition that the degradation of phosphors comprising $Eu^{2+}$ as the activator in gas discharge lamps for dielectrically impeded discharges due to photo-oxidation of said $Eu^{2+}$ is caused by the VUV radiation from the gas discharge lamp having a wavelength in the range from 100 to 200 nm, whereas excitation by means of light having a longer wavelength in the range from 200 to 400 nm does not lead to any observable loss in efficiency. It has been found that this photo-oxidation of the phosphor is precluded if the phosphor contains $Nd^{3+}$ as the activator.

In accordance with a preferred embodiment of the invention, the host lattice is composed of an inorganic material selected from the group formed by oxides, sulphides, halogenides, aluminates, gallates, thiogallates, phosphates, borates and silicates.

It is particularly preferred that the phosphor is selected from the group formed by $(Y_{1-x}Gd_x)SiO_5:Nd$, $(Y_{1-x}Gd_x)BO_3:Nd$, $(La_{1-x}Y_x)PO_4:Nd$ and $(Y_{1-x}Gd_x)O_3:Nd$, where $0 \leq x \leq 1$.

Within the scope of the invention it is preferred that the phosphor layer comprises a second blue phosphor selected from the group formed by $(Ba,Sr)MgAl_{10}O_{17}:Eu^{2+}$; $(Y_{1-x}La_x)_2SiO_5:Ce$, where $0 \leq x \leq 1$ and $(Ba_{1-x-y}Sr_xCa_y)_5(PO_4)_3Cl:Eu$, where $0 \leq x \leq 1$ and $0 \leq y \leq 1$.

The invention also relates to a blue phosphor comprising a host lattice and $Nd^{3+}$ as the activator. Such a phosphor can be advantageously used also for the phosphor layer of colored plasma display screens.

These and other aspects of the invention are apparent from and will be elucidated with reference to the figure and to the embodiment(s) described hereinafter.

A gas discharge lamp for dielectrically impeded discharges in accordance with the invention comprises a discharge vessel 10 containing a gas filling, which discharge vessel 10 comprises at least one wall 12 of a dielectric material and at least one wall 14 having a surface that is at least partly transparent to visible radiation and coated with a phosphor layer 16. Said phosphor layer comprises a phosphor preparation including a blue phosphor of an inorganic crystalline host lattice, the luminosity of said phosphor being obtained by activating it using a $Nd^{3+}$ dopant. In addition, the gas discharge lamp is provided with electrodes 18 and 20 for a dielectrically impeded discharge and with means 22 for igniting and maintaining the dielectrically impeded discharge.

A typical construction of the gas discharge lamp comprises a cylindrical, xenon-filled lamp bulb of glass whose outer wall is provided with a pair of strip-shaped electrodes which are arranged so as to be electrically insulated from each other. The strip-shaped electrodes extend throughout the length of the lamp bulb so as to face each other with their long sides, while leaving two gaps clear. The electrodes are connected to the poles of a high-voltage source, which is operated with an alternating voltage of the order of 20 kHz to 500 kHz in such a manner that an electric discharge develops only in the region of the inside surface of the lamp bulb.

If an AC voltage is applied to the electrodes, a corona discharge can be ignited in the xenon-containing filling gas. This leads to the formation of excimers in the xenon, i.e. molecules which are stable only in the excited state. $Xe+Xe^*=Xe_2^*$ The excitation energy is delivered as UV radiation having a wavelength $\lambda=160$ to 190 nm. This conversion of electron energy to UV radiation takes place very efficiently. The generated UV photons are absorbed by the phosphors of the phosphor layer and the excitation energy is partly delivered again in the region of the spectrum having a longer wavelength.

In principle, a plurality of different structural shapes are possible for the discharge vessel, such as plates, simple tubes, coaxial tubes, straight, U-shaped, circularly bent or coiled, cylindrical, or differently shaped, discharge tubes.

As the material for the discharge vessel use is made of, for example, quartz or glass.

The electrodes consist of, for example, a metal such as aluminum or silver, a metal alloy or a transparent, conductive, inorganic compound such as ITO. They can be embodied so as to be a coating, an adhesive foil, wire or wire netting.

To concentrate the light intensity in a specific direction, a part of the discharge vessel may be provided with a coating serving as a reflector for VUV and UV-C light.

The discharge vessel is filled with a gas mixture comprising an inert gas such as xenon, krypton, neon or helium. Gas fillings comprising predominantly oxygen-free xenon are preferred.

The inner wall of the gas discharge vessel is partly, or entirely, coated with a phosphor layer containing one or more phosphors or phosphor preparations. In addition, the phosphor layer may comprise an organic or inorganic binder or a binder composition.

The phosphor is a phosphor comprising the $Nd^{3+}$ ion as the activator in a host lattice. Said neodymium$^{3+}$ ion is not readily oxidizable to $Nd^{4+}$.

The host lattice may be composed of an inorganic material, such as oxides, sulphides, halogenides, aluminates, gallates, thiogallates, phosphates, borates or silicates, doped with a few percent of the activator.

The host lattice does not participate in the luminescence process, it does influence however the exact position of the energy levels of the activator ion and hence the wavelengths of absorption and emission.

The $Nd^{3+}$-activated phosphors used in accordance with the invention are primarily phosphors with a host lattice that exerts a weak ligand field, in particular the oxygen-containing host lattices of oxides, aluminates, gallates, phosphates, borates or silicates. In these phosphors, the lowest excited 4f5d state is 43,000 $cm^{-1}$ above the ground state, i.e. above 230 nm. Therefore, said $Nd^{3+}$-activated phosphors are particularly efficient phosphors when they are excited by UV radiation under vacuum. As an activator in the different host lattices, the $Nd^{3+}$ ion exhibits mostly broad absorption bands in the ultraviolet range that partly extend into the blue range. The emission bands lie in the long UV to yellow-orange ranges, but predominantly in the blue range. The quenching temperature of these phosphors is slightly above 100° C.

The $Nd^{3+}$-activated phosphors preferably comprise 0.1 to 30 mol % neodymium$^{3+}$.

Said phosphors have a very large absorption coefficient and a high quantum yield for the wavelengths in the xenon radiation range.

The grain size of the phosphor particles is not critical. Customarily, use is made of phosphors in the form of fine-grain powder having a grain size distribution between 1 and 20 $\mu$m.

For the manufacture of a phosphor layer on a wall of the discharge vessel use can be made of dry coating methods, such as electrostatic deposition or electrostatically assisted powdering, as well as wet coating methods such as dip coating or spraying.

In the case of wet coating methods, the phosphor preparation must be dispersed in water, an organic solvent, if necessary in conjunction with a dispersing agent, a tenside and an anti-foaming agent, or a binder preparation. Organic or inorganic binders capable of withstanding an operating temperature of 250° C. without being subject to decomposition, embrittlement or discoloration can suitably be used as the binder preparations for a gas discharge lamp in accordance with the invention.

The phosphor preparation can be applied, for example, to a wall of the discharge vessel by means of a flooding process. The coating suspensions used for the flooding process comprise water or an organic compound, such as butylacetate, as the solvent. The suspension is stabilized by adding auxiliary agents, such as stabilizers, liquefiers, cellulose derivatives, and influenced in its rheological properties. The phosphor suspension is applied in the form of a thin layer to the walls of the vessel, after which it is dried and fired at 600° C.

It may alternatively be preferred to electrostatically deposit the phosphor preparation for the phosphor layer onto the inside of the discharge vessel.

For a gas discharge lamp for dielectrically impeded discharges, which lamp should emit white light, preferably a blue-emitting phosphor from the group formed by $(Y_{1-x}Gd_x)SiO_5$:Nd, $(Y_{1-x}Gd_x)BO_3$:Nd, $(La_{1-x}Y_x)PO_4$:Nd and $(Y_{1-x}Gd_x)_2O_3$:Nd, where $0 \leq x \leq 1$ is combined with a red-emitting phosphor from the group formed by (Y,Gd)$BO_3$:$Eu^{3+}$ and $Y(V,P)O_4$:$Eu^{3+}$ and a green-emitting phosphor from the group formed by (Y,Gd)$BO_3$:$Tb^{3+}$, $LaPO_4$:$Ce^{3+}$,$Tb^{3+}$ and $Zn_2SiO_4$:Mn.

Within the scope of the invention it is preferred that the phosphor layer comprises a second blue phosphor selected from the group formed by $(Ba,Sr)MgAl_{10}O_{17}$:$Eu^{2+}$; $(Y_{1-x}La_x)_2SiO_5$:Ce, where $0 \leq x \leq 1$ and $(Ba_{1-x-y}Sr_xCa_y)_5(PO_4)_3$Cl:Eu, where $0 \leq x \leq 1$ and $0 \leq y \leq 1$.

The thickness of the phosphor layer customarily ranges from 5 to 100 $\mu$m.

The vessel is subsequently evacuated so as to remove all gaseous impurities, in particular oxygen. Next, the vessel is filled with xenon and sealed.

EXAMPLE 1

A cylindrical discharge vessel of glass having a length of 590 nm, a diameter of 10 nm and a wall thickness of 0.8 nm is filled with xenon at a pressure of 200 hPa. The discharge vessel comprises an inner electrode, which extends parallel to the axis, and which is in the form of a rod of a noble metal having a diameter of 2.2 mm. The outside surface of the discharge vessel is provided with the outer electrode in the form of two conductive silver strips having a width of 2 mm each, which strips are arranged so as to be parallel to the axis and conductively connected to the power supply. The lamp is operated by means of a pulsed DC voltage.

The inside wall of the discharge vessel is coated with a phosphor layer. Said phosphor layer comprises a three-band phosphor mixture having the following components: $Y_2SiO_5$:Nd(1%) as the blue component, $Y_2O_3$:Eu as the red component and $Y_2SiO_5$:Tb as the green component.

To manufacture said $Y_2SiO_5$:Nd(1%), a quantity of 10.0 g (44.38 mmol) $Y_2O_3$, 0.09 g (0.45 mmol) $NdF_3$ and 2.755 g (45.85 mmol) $SiO_2$ are thoroughly mixed and ground in an agate mortar. Said mixture is suspended in water. After it has been subjected to an ultrasonic treatment for 10 minutes, the suspension is evaporated to dryness and dried further at approximately 100° C. Subsequently, the mixture is mixed with 0.5 g CsF as the fluxing agent and ground in an agate mortar. The mixture is sintered for 2 hours at 1350° C. The sintered powder is ground again and sieved so as to obtain a grain size d<36 $\mu$m.

The color point of the blue phosphor $Y_2SiO_5$:Nd is approximately x=0.19 and y=0.12.

Using this lamp, a light output of initially 37 lm/W was achieved. After 1000 working hours, the light output was approximately 34 lm/W. The quantum yield for VUV light is approximately 70%.

What is claimed is:

1. A gas discharge lamp for dielectrically impeded discharges, which gas discharge lamp comprises a discharge vessel filled with a gas filling, which discharge vessel comprises at least one wall of a dielectric material, and at least one wall having a surface which is at least partly transparent to visible radiation, and a phosphor layer containing a blue phosphor with a host lattice and $Nd^{3+}$ as the activator, electrodes for a dielectrically impeded discharge, and means for igniting and maintaining the discharge.

2. A gas discharge lamp as claimed in claim 1, characterized in that the host lattice is composed of an inorganic material selected from the group formed by oxides, sulphides, halogenides, aluminates, gallates, thiogallates, phosphates, borates and silicates.

3. A gas discharge lamp as claimed in claim 1, characterized in that the phosphor is selected from the group formed by $(Y_{1-x}Gd_x)SiO_5$:Nd, $(Y_{1-x}Gd_x)BO_3$:Nd, $(La_{1-x}Y_x)PO_4$:Nd and $(Y_{1-x}Gd_x)_2O_3$:Nd, where $0 \leq x \leq 1$.

4. A gas discharge lamp as claimed in claim 1, characterized in that the phosphor layer comprises a second blue phosphor selected from the group formed by (BaSr)$MgAl_{10}O_{17}$:$Eu^{2+}$; $(Y_{1-x}La_x)_2SiO_5$:Ce, where $0 \leq x \leq 1$ and $(Ba_{1-x-y}Sr_xCa_y)_5(PO_4)_3Cl$:Eu, where $0 \leq x \leq 1$ and $0 \leq y \leq 1$.

5. A discharge lamp phosphor layer comprising a blue phosphor, the blue phosphor having a host lattice and an activator, the activator consisting essentially of $Nd^{3+}$.

6. The layer of claim 5 wherein the host lattice is an oxide, sulphide, halogenide, aluminate, gallate, thiogallate, phosphate, borate or silicate.

7. The layer of claim 5 wherein the blue phosphor is 0.1 to 30 mol % $Nd^{3+}$.

8. The layer of claim 5 wherein the blue phosphor is 20 to 30 mol % $Nd^{3+}$.

* * * * *